United States Patent
Finlayson et al.

(10) Patent No.: US 8,479,013 B2
(45) Date of Patent: Jul. 2, 2013

(54) SECURE PORTABLE DATA TRANSPORT AND STORAGE SYSTEM

(75) Inventors: James Finlayson, Eugene, OR (US); Reena B. Gordon, Los Angeles, CA (US); Mark Gurkowski, Longmont, CO (US); Lane Lee, Boulder, CO (US)

(73) Assignee: Photonic Data Security, LLC, Torrance, CA (US)

( * ) Notice: Subject to any disclaimer, the term of this patent is extended or adjusted under 35 U.S.C. 154(b) by 1108 days.

(21) Appl. No.: 12/355,680

(22) Filed: Jan. 16, 2009

(65) Prior Publication Data

US 2009/0327743 A1    Dec. 31, 2009

Related U.S. Application Data

(60) Provisional application No. 61/022,306, filed on Jan. 18, 2008.

(51) Int. Cl.
*G06F 21/00* (2006.01)

(52) U.S. Cl.
USPC ............... 713/186; 713/193; 726/26; 726/27; 726/28; 726/29; 726/30

(58) Field of Classification Search
USPC ............ 713/164, 165, 186, 189, 193; 726/26, 726/27, 28, 29, 30; 382/115, 124
See application file for complete search history.

(56) References Cited

U.S. PATENT DOCUMENTS

| | | | |
|---|---|---|---|
| 6,496,928 B1 * | 12/2002 | Deo et al. ........................ | 713/153 |
| 7,111,005 B1 * | 9/2006 | Wessman ........................... | 1/1 |
| 2001/0036301 A1 * | 11/2001 | Yamaguchi et al. .......... | 382/125 |
| 2002/0073340 A1 * | 6/2002 | Mambakkam et al. ........ | 713/202 |
| 2003/0005337 A1 * | 1/2003 | Poo et al. ........................ | 713/202 |
| 2003/0226026 A1 * | 12/2003 | Magoshi ........................ | 713/193 |
| 2004/0003289 A1 * | 1/2004 | Bhogal et al. .................. | 713/201 |
| 2004/0025036 A1 * | 2/2004 | Balard et al. ................... | 713/189 |
| 2004/0146015 A1 * | 7/2004 | Cross et al. .................... | 370/328 |
| 2005/0114686 A1 * | 5/2005 | Ball et al. ........................ | 713/193 |
| 2005/0144464 A1 * | 6/2005 | Chiu et al. ..................... | 713/186 |

(Continued)

FOREIGN PATENT DOCUMENTS

WO    WO 2008074342 A1 *    6/2008

OTHER PUBLICATIONS

Bakker et al., Investigating 'secure' USB sticks, Nov. 26, 2007, Version 1.4, Fox Crypto.*

*Primary Examiner* — Eleni Shiferaw
*Assistant Examiner* — Hilary Branske
(74) *Attorney, Agent, or Firm* — Fulwider Patton LLP

(57) ABSTRACT

A portable data transport device that provides security to data stored therein, and is configured to communicate data with a host computer for securing and transporting data. The portable data transport device includes a first processor and a biometric identification system. Upon successful biometric identification of an enrolled user, the first processor permits mounting of the data transport device to a host computer. However, prior to the commencement of read/write operations, cross-checking of stored identification codes of components of the portable data transport device occurs, including the use of a hash function. If any identifier does not match, no read/write data operations are permitted. The portable data transport device includes a file security program that includes a DLL encryption/decryption program having a self-check feature. Upon self check, if any changes were made to the encryption/decryption program, no read/write operations are permitted.

13 Claims, 9 Drawing Sheets

U.S. PATENT DOCUMENTS

| | | | |
|---|---|---|---|
| 2006/0117377 A1* | 6/2006 | Frenkiel et al. | 726/2 |
| 2007/0061597 A1* | 3/2007 | Holtzman et al. | 713/193 |
| 2007/0067641 A1* | 3/2007 | Chou et al. | 713/186 |
| 2007/0214369 A1* | 9/2007 | Roberts et al. | 713/192 |
| 2007/0255963 A1* | 11/2007 | Pizano et al. | 713/189 |
| 2008/0181406 A1* | 7/2008 | Iyer et al. | 380/277 |

* cited by examiner

SECURE PORTABLE DATA TRANSPORT AND STORAGE SYSTEM

CROSS-REFERENCES TO RELATED APPLICATIONS

This application claims priority from U.S. Provisional Application Ser. No. 61/022,306, filed Jan. 18, 2008, incorporated by reference in its entirety.

BACKGROUND OF THE INVENTION

The invention is related generally to data security and, more particularly, to the secure transport of data.

The practical difficulties of the coordinated management of different systems and components for the security of data, as well as systemic failures to protect against both known and previously unrecognized security attack approaches, contribute to the vulnerabilities to security breaches of systems, components, and networks. Protecting sensitive and confidential data, such as social security numbers, financial information, project plans, vendor lists, future product development plans, schedules, and other data, is of primary importance. In many cases, such data must be transported from one location to another, yet must be kept secure. Managing the security features for all components of a system involved in transporting data, such as local computers, data storage devices, data transport devices, host computers, networks, main frames for example, can be a difficult task.

One particularly common occurrence is the need to transport data to another location for discussion or support purposes. For example, people asked to make a presentation at a confidential meeting in a remote location may need to transport the necessary sensitive data to be presented. A laptop computer may seem to be a good choice for transporting and presenting that data. On the other hand, if the remote location has the necessary computer and software to make the presentation, the best choice may appear to be simply transporting the data on a portable non-volatile data transport device, such as a flash drive, that can be used with the computer and software at the meeting location.

Further security difficulties arise with the transport of sensitive data on portable, non-volatile data transport devices, such as laptops, flash drives, portable hard drives, and others. Such devices are easier targets of theft and are easily lost due to their small size. Portable devices are not subject to a secure environment as are main frames and desktop devices kept in secure office buildings or laboratories and are therefore much more easily stolen. Once the portable data transport device is stolen, the thief can attempt to retrieve the data residing therein in a controlled environment. Even if the portable data transport device was lost for a reason other than theft, the finder of that device may desire to recover the data on it. While it is likely difficult to avoid a certain level of theft or loss just due to the small size and portable nature of the data transport devices themselves, it would be desirable to make retrieval of the data stored in such portable devices more difficult, if not impossible. Hence, the employment of security features on a portable data transport device would be desirable so that even if lost or stolen, the data transported on the data transport device cannot be read by anyone but its owner.

Laptop computers are portable and portable data transport devices such as flash drives that are used by the laptop computers and desk-top computers are commonly used today for the transport of confidential data. As with other data transport devices, data security has become a critical issue with flash drives, particularly when data is being physically transported. Thousands of laptop computers and flash drives are stolen every day. Sometimes data thieves set out to steal specific confidential data, which becomes compromised when it falls into the wrong hands. Theft of such data can wreak havoc on trust, reputation, and the ability to carry out a mission. Even the perception of a data assault may be damaging, sometimes irreparably. A higher level of protection for such portable data transport devices has been a goal for those of skill in the art. While personnel who are in charge of such portable data transport devices may undergo specific training on avoiding data theft, such efforts are likely to yield limited improvement in keeping data secure. Additionally, those skilled in the art have directed efforts toward making data more difficult to retrieve from such data devices.

Conventionally, security protections are implemented variously as password challenges and data and connection filters layered over the core functionality of an existing computer system or data memory component. The conventional implementation of security functions in software in computer systems and network components implicitly recognizes the inherent complexity of establishing robust security mechanisms. For example, there has been a very practical need to frequently apply patches to close both previously unrecognized and newly emergent vulnerabilities. While patches may be successful for the particular vulnerability, they add complexity to a system and yet another vulnerability may appear and require further security efforts. On the other hand, providing a system designed from the beginning with data security in mind and in which data security features have formed the very foundation of the data memory system would be desirable. Complexity could be substantially lessened when the architecture of a device; i.e., the integration and design of the hardware, firmware, and software of the device, has a primary purpose of protecting the data transported by such a device, yet is also designed to provide the necessary functionality and ease of use.

In designing data security systems, it is also important that data transport devices used to transport sensitive data be relatively easy to use and that they be usable on a wide range of different host computers. Such host computers may be in different locations of the world and may be obtained from different manufacturers having different hardware and software configurations. However, many host computers today have a powered universal serial bus (USB) interface and utilize Microsoft Windows® as the operating system. This provides a common basis for which a portable data transport device usable to transport data may be designed. Using security features in a portable data transport device that would require a host computer to have an atypical configuration, such as requiring the existence of certain security software to be run in addition to the Microsoft Windows® operating system for example, is undesirable due to the need to transport data to many different locations and the possible unavailability of such security software in the configuration of the host computer. Thus, providing more effective security features but at the same time not raising the configuration requirements for host computers are highly desirable.

Passwords are commonly used to maintain the confidentiality of such data and are meant to limit access to only those persons who are authorized to have access. However passwords can be cracked by unauthorized users. Short passwords are easier to crack than longer passwords. Also, passwords are frequently based on a birth date, phone number, or some other some other available information that is simple to guess and are therefore not secure. Even a complicated, randomly generated password can often be readily stolen. Password cracking has been found to be effective against short passwords, dictionary words, user names, relatives' names, social security numbers, employee numbers, and other personal information. Password-based data accessing systems based on such vulnerable passwords are thus vulnerable to criminal attack with resultant risk and damage to industry and the economy and even to people's lives.

Stronger password systems have been devised in which a password cannot be assigned unless it has a certain minimum length and includes mixed symbols and letters, or mixed numbers with letters, or is based on a short phrase. Enforcing a requirement for such stronger passwords has resulted in systems that are less likely to be cracked. Thus password systems can provide a certain level of security, although their use has vulnerabilities.

Another protective measure taken to keep data secure is encryption. In general, encryption is the process of transforming data using a cipher to make it unreadable to anyone except those possessing special knowledge, usually referred to as a key. Without the proper key, the encrypted data can be decrypted into a usable format only with a substantial investment of time and processing resources, and even then, only if certain characteristics of the unencrypted data are known (or at least are predictable). Successfully using encryption alone to ensure security can be a challenging problem. While strong ciphers can be devised, a single error in the design of the system or the execution of encryption can allow successful attacks. Also, having the key in the same location as the encrypted data can provide a vulnerability unless a further protection measure is taken.

Simply encrypting data is restrictive in that there may not exist any convenient manner to handle the portability of the data while maintaining the integrity and security of the data. For example, the data may be encrypted and reside or be transferred to a portable storage medium such as a flash drive, a compact disk, a portable hard drive, a floppy disk, or other. If the encrypted data is transported to another host computer, there does not exist a convenient process to decrypt the data for use while simultaneously safeguarding data integrity and data security. The encryption key must somehow be communicated to the next host computer which may enable decryption by an unauthorized person. Carrying the decryption key with the data is unwise due to possible theft and places more of a burden on the person transporting the data storage device.

Encryption also offers a higher level of security to data; however its effectiveness can likewise be compromised when it is simply included as an additional security layer in an already-existing computer or network system. While encryption systems can provide a high degree of security, ease of use is also of primary importance. As a result, those skilled in the art have recognized the value of encryption in securing data undergoing transport, but a further need exists for making the encryption/decryption process more convenient. At the same time, making that process more convenient may compromise the security provided by the encryption technology.

Another data protection technique that has been developed is user authentication such as by use of a biometric system. Such systems are designed to identify a personal characteristic of a user, such as a fingerprint or retina, and store that characteristic in a data transport device. Upon desiring access, the user must scan that personal characteristic. The biometric system then compares that scanned personal characteristic to the stored personal characteristic. If the scanned and stored characteristics are identical, access is permitted by the biometric system. A high degree of security is provided by such systems; however they too have vulnerabilities. Unfortunately, some such biometric authentication systems can also be rendered ineffective by various means, such as by physically swapping components on a data transport device, or by resetting the operating system, or by other means.

As one example of a vulnerability, a laptop computer may have a biometric fingerprint reader installed in the computer that denies access to use of the computer unless the fingerprint of the user attempting to access the computer matches a fingerprint stored in a data base in the laptop computer. However, simply removing the hard drive from that computer and installing it in another computer has been found to permit access to all data stored on that hard drive. In this example and others, the simple substitution of hardware components can be used to overcome certain security systems.

As with the other security systems described above, the biometric system has strengths and weaknesses. While these security systems can provide a degree of security over stored data, each fails to establish a comprehensive security system. Many systems remain particularly vulnerable to basic Trojan [horse] attacks for obtaining passwords and encryption keys, thereby permitting complete conversion of the security systems to support inappropriate access to and modification of the stored data. Furthermore, these systems by themselves may provide no protection against the execution of user-mode programs that may exploit vulnerabilities in the operating system to gain unlimited root or administrator control over the operating system. An intruder can then either directly circumvent the kernel password and encryption mechanisms or breach the security of the password and encryption key management systems to obtain the passwords and keys. In either case, the intruder again obtains unencumbered access to the ostensibly secured stored data over the heightened encryption-based security capabilities with little greater difficulty than exploiting the typically limited security protections afforded by the operating system itself.

Adding one or more of these security systems to an already-existing system can increase complexity and cause unrecognized security vulnerabilities while obtaining only a small incremental increase in security. While it would be desirable to incorporate at least two layers of data protection security in a portable data transport device, it would be preferable if the basic architecture of the portable data transport device were designed so as to fully integrate such security features with the basic data transport operation such that they are primary components.

Hence, those skilled in the art of data security have recognized a need for a more secure data transport system. A need has further been recognized for a portable data transport device in which the basic architecture of the device fully integrates multiple security systems with the data memory and handling operations. The present invention fulfills these needs and others.

SUMMARY OF THE INVENTION

Briefly and in general terms, the present invention is directed to a system for secure data transport and storage in which a portable data transport device on which such data is stored is agnostic regarding host computers to which it may be connected. In one aspect, there is provided a portable data transport device that provides security to data stored therein, and is configured to communicate data with a host computer, the portable data transport device comprising a first processor configured for communication with a host computer to which the portable data transport device is connected, the first processor configured to block mounting of the portable data transport device to the host computer until the first processor receives a data key match, a non-volatile memory in which is stored a confirming data key and data representing a physical parameter of an enrolled user of the portable data transport device, a biometric processor in communication with the non-volatile memory, and a biometric reader disposed as part of the portable data transport device and disposed in communication with the biometric processor, the biometric reader configured to read a predetermined physical parameter of a person and provide data representing the physical parameter that was read, wherein the biometric processor is configured to receive the data representing the read physical parameter, compare it to stored data representing a physical characteristic of an enrolled user stored in the non-volatile memory, and if a match results, output the confirming data key from the non-volatile memory, wherein the first processor is configured to receive the output confirming data key from the biometric processor, compare the received confirming data key with a stored reference data key, and if a match is found, cease blocking the mounting of the portable data transport device to the connected host computer.

In more detailed aspects, the biometric reader comprises a unique biometric reader identifier code, the non-volatile memory stores a reference biometric reader identifier code for the biometric reader, and the biometric processor is configured to process physical parameter data from the reader only after it has: read the unique identifier code from the biometric reader, compared it to the reference biometric reader identifier code stored in the non-volatile memory, and found a match between the two identifier codes. The portable data transport device comprises: an embedded product identifier and executable operational software having an associated identifier, the software is configured to create a hash function comprising the embedded product identifier and the software identifier, the portable data transport device compares the created hash function against a current hash function value stored in the portable data transport device and if a match is found, the portable data transport device permits both read and write operations to occur.

In other aspects, the portable data transport device further comprises firmware and associated firmware memory that is accessible only to the firmware, wherein the current function value is stored in the firmware memory, and an encryption/decryption program having an associated identifier, the software is configured to create the hash function further comprising the encryption/decryption program identifier, the firmware compares the created hash function against the current hash function value stored in the firmware memory and if a match is found, the firmware removes write protection from the portable data transport device. The first processor is configured, upon mounting the portable data transport device to the host computer, to initially review data on the portable memory for unencrypted data and if such is found, prohibit read/write operations until the unencrypted data is deleted or encrypted and indicate to an enrolled user that such data must be encrypted or deleted before further operations with the portable data transport device will be permitted. In another aspect, the first processor is configured to auto-detect and delete any unencrypted data found on the portable data transport device.

In yet further aspects, the portable data transport device includes a file security program comprising a dynamic link library containing the encryption/decryption operation program, wherein the portable data transport device is configured to perform a self-check of the encryption/decryption program of the dynamic link library prior to permitting read/write operations of the portable data transport device, wherein the self check process comprises determining if any changes have occurred in the encryption/decryption program of the dynamic link library since the last check of the dynamic link library and if any changes are found, the portable data transport device is further configured to prohibit read and write operations of the portable data transport device. The portable data transport device wherein neither the comparison between data keys nor the comparison between hash functions can be overridden or otherwise avoided, and the received confirming data key must match with the stored reference data key and the created hash function must match with a stored current hash function value before read and write operations on the portable data transport device are permitted.

In other aspects in accordance with the invention, the portable data transport device of claim 7 further comprising a file security program that comprises an encryption operation that allows an enrolled user at a host computer to select multiple files to be encrypted together into a single data container pack file and to store that data container pack file on the portable data transport device, and a decryption operation that allows an enrolled user at a host computer to select and decrypt files included in a data container pack file stored on the portable data transport device, wherein data container pack files are configured such that when initially selected to be opened by a decryption operation at the portable data transport device, only an index of the files encrypted together into the selected data container pack file is displayed, and from that index one or more files may be selected for decryption, wherein the portable data transport device includes a file viewer program with which an enrolled user using a host computer may view an index of data container pack files stored in the portable data transport device. The biometric function, identifier matching functions, and the file security program are self-contained whereby the portable data transport device is agnostic regarding host computers.

In yet more detailed aspects, the file security program is configured to permit an enrolled user at a host computer to selectively assign a single password to a data container pack file whereby individual files within the data container pack file do not have individual passwords and are subject to decryption only upon successful entry of the password for the entire data container pack file, the file security program is configured so that data container pack files stored on the portable data transport device cannot be opened without input of the unique password for the data container pack file, and if a user enters an incorrect password a predetermined number of times, the first processor will erase all data in any volatile memory it is using and will lock itself in a non-operational configuration. The first processor is configured so that once it has been initialized, it cannot be reset except by an administrator, and once memory used by the biometric processor has been used for storing enrolled user and administrator parameter data or for storing the reference data key, that memory is locked from further read/write operations except for use by an administrator.

In other aspects in accordance with the invention, there is provided a portable data transport device that provides security to data stored therein, and is configured to communicate data with a host computer, the portable data transport device comprises a first processor disposed on the portable data transport device configured for communication with a host computer, a non-volatile memory in which may be stored encrypted files by the first processor, a file security program comprising an encryption operation that allows an enrolled user to select multiple files to be encrypted together into a single data container pack file and to store that data container pack file on the portable data transport device, wherein the file security program is configured to permit an enrolled user to selectively assign a single password to each data container pack file whereby individual files within the data container pack file do not have individual passwords and are subject to decryption only upon successful entry of the password for the entire data container pack file, the file security program is configured so that data container pack files stored on the portable data transport device cannot be opened without input of the unique password for the data container pack file, and the file security program comprises a dynamic link library containing the encryption/decryption operation program, wherein the portable data transport device is configured to perform a self-check of the encryption/decryption program of the dynamic link library prior to permitting read/write operations of the portable data transport device, wherein the self check process comprises determining if any changes have occurred in the encryption/decryption program of the dynamic link library since the last check of the dynamic link library and if any changes are found, the portable data transport device is further configured to prohibit read and write operations of the portable data transport device.

In a further aspect, there is provided a portable data transport device that provides security to data stored therein, and is configured to communicate data with a host computer, the portable data transport device comprises a first processor configured for communication with a host computer to which the portable data transport device is connected, a non-volatile memory in which is stored a confirming data key and data representing a physical parameter of an enrolled user of the portable data transport device, a biometric processor in communication with the non-volatile memory, and a biometric reader disposed as part of the portable data transport device and disposed in communication with the biometric processor, the biometric reader configured to read a predetermined physical parameter of a person and provide data representing the physical parameter that was read, wherein the biometric processor is configured to receive the data representing the read physical parameter, compare it to stored data representing a physical characteristic of an enrolled user stored in the non-volatile memory, and if a match results, output the confirming data key from the non-volatile memory, wherein the non-volatile memory may store encrypted files, a file security program comprising an encryption operation that allows an enrolled user to select multiple files to be encrypted together into a single data container pack file, assign a single password to each pack file, and to store that data container pack file on the portable data transport device, the host computer, or other storage device with which the data transport device is in communication.

The foregoing is merely a summary of features of the invention. The features and advantages of the invention will be more readily understood from the following detailed description which should be read in conjunction with the accompanying drawings.

DETAILED DESCRIPTION OF THE PREFERRED EMBODIMENTS

Figure 1:
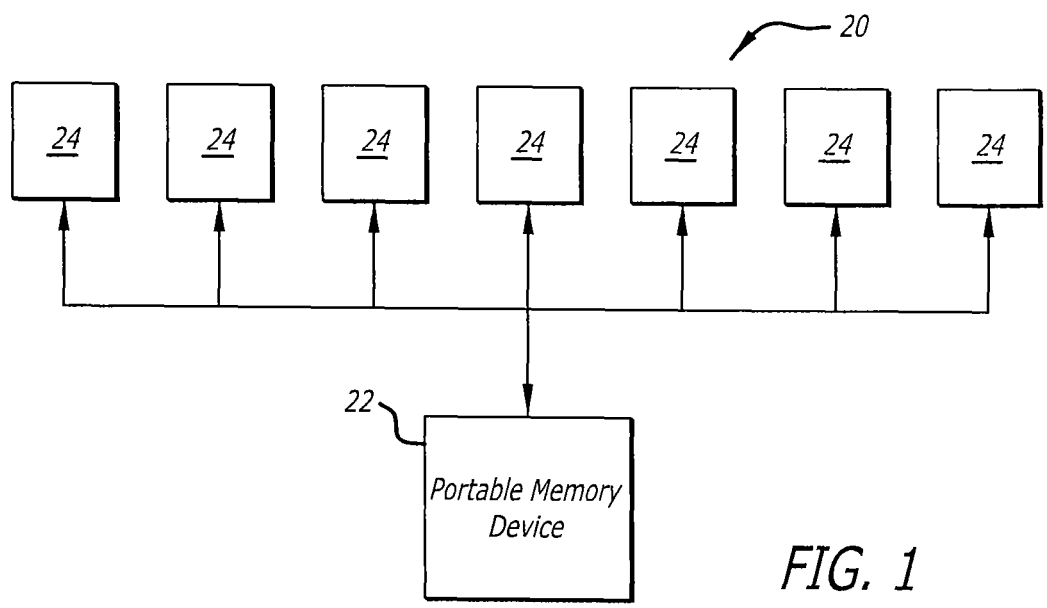
FIG. 1 is a block diagram illustrating a data security system in accordance with an aspect of the invention in which a portable data device is host agnostic and is usable, with all the data security features, with any of a plurality of hosts.
Figure 2:
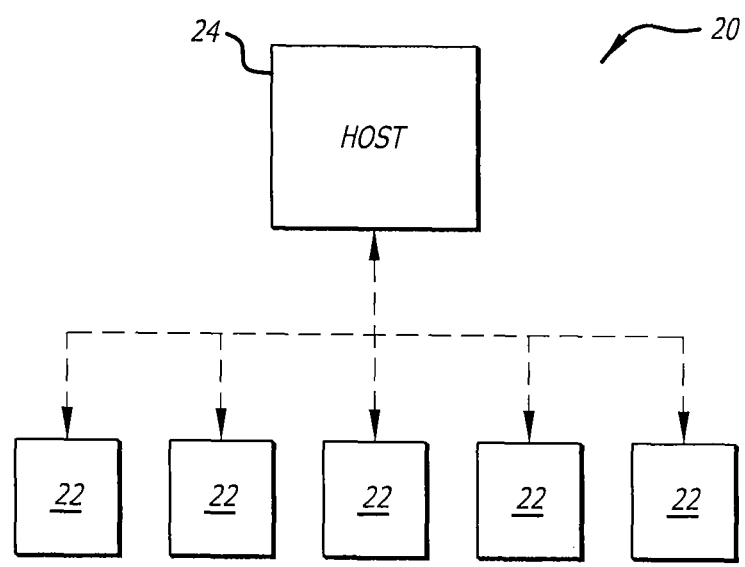
FIG. 2 is a block diagram similar to FIG. 1 illustrating a data security system in which a plurality of portable non-volatile data transport devices are host agnostic and therefore, any of the portable data transport devices may be used on any of the hosts without sacrifice or compromise of any of the data security features.

Referring now in more detail to the exemplary drawings for purposes of illustrating features and embodiments of the invention, wherein like reference numerals designate corresponding or like elements among the several views, there is shown in FIG. 1 a secure data transport and storage system 20 in which the same portable non-volatile data transport device 22 may be used with any of a plurality of host computers 24. In another aspect, and referring now also to FIG. 2, the secure data transport and storage system 20 also provides that a plurality of portable non-volatile data transport devices 22 may be used with the same host computer 24 representing the concept that the portable data transport devices 22 are "host agnostic." That is, the portable data transport devices are able to securely transport data among a number of host computers. The term "portable non-volatile data transport device" is meant to refer to those devices capable of storing data thereon and being movable from site to site such that they are considered portable. Examples include flash memory devices that are ubiquitous today, portable hard drives, compact discs, and floppy discs, but are not limited to such devices. They may be connected to a host computer through a universal serial bus (USB) interface or other, and may provide their own power source or use that of the host computer.

Figure 3:
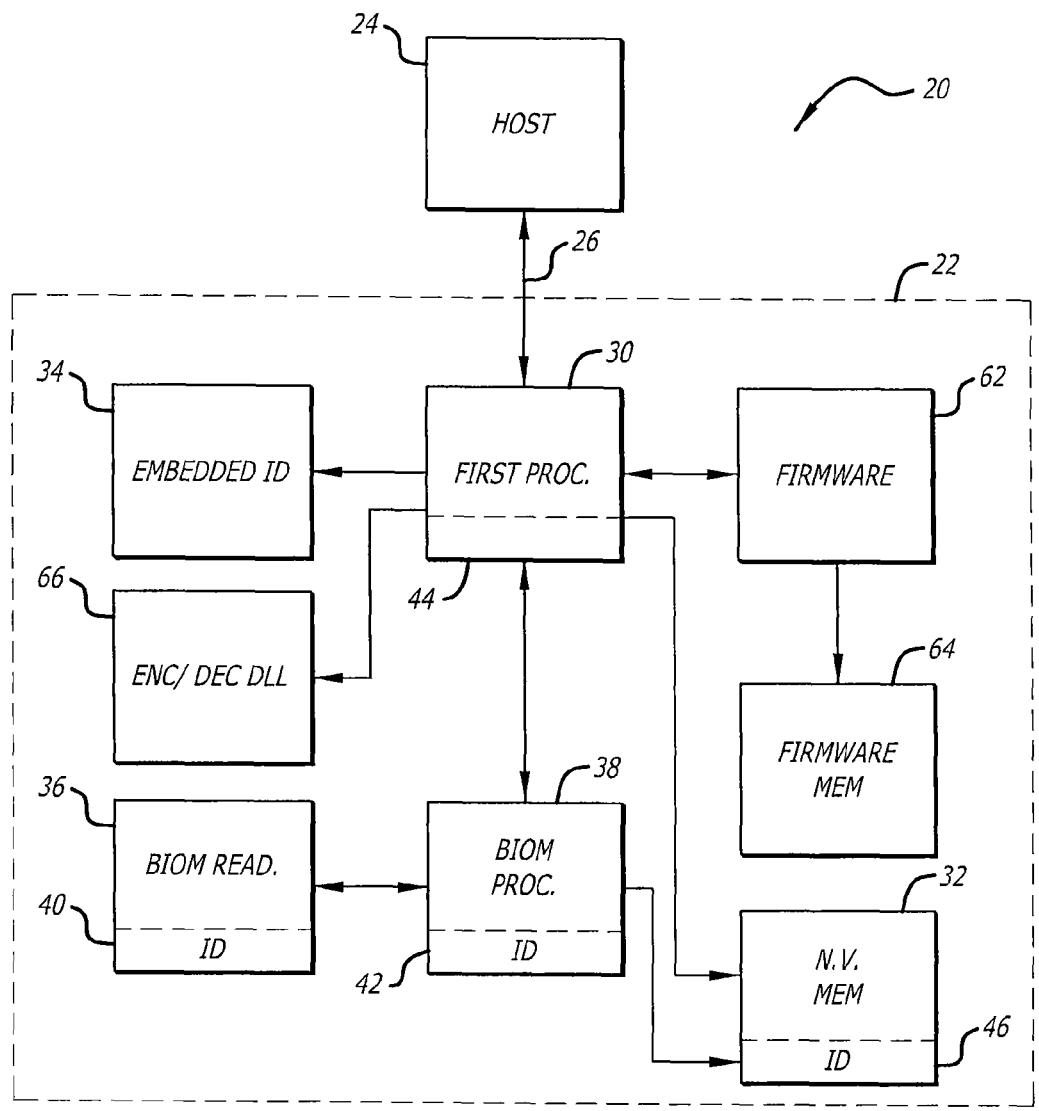
FIG. 3 is a block diagram showing a single host connected with a portable non-volatile data transport device having a separate first processor and biometric processor, the portable data transport device including a biometric reader in accordance with aspects of the invention.

Referring now to FIG. 3, there is shown in block diagram form a connection of a portable non-volatile data transport device 22 to a host computer 24. In this embodiment, although details are not shown, the portable data transport device is connected via USB 2.0 connection 26. Such connection details are not provided here and are not included in the drawings since they are well known to those of ordinary skill in the art. The portable data transport device is connected to the host computer at this time and receives electrical power from the host computer in this embodiment as is standard with such a USB connection, even though the portable data transport device has not yet been "mounted" to the host computer. As used herein, the term "mount," "mounting," or "mounted" has the definition commonly given. That is, connecting a data transport device to a host computer and making it known to the operating system of that computer, or to make a physical data transport device accessible to the file system of a computer.

The portable data transport device 22 of the block diagram of FIG. 3 comprises a first processor 30 used to control communications between the portable non-volatile data transport device and the host computer 24, as well as perform various control functions internally to the device 22. While referred to herein as a first "processor," this term is not meant to be restrictive. Such devices are also known as "controllers" and are meant to be included. A non-volatile memory 32 is provided on the portable data transport device 22. This memory may take many forms, one of which is NAND gate flash memory, and may actually comprise multiple chips or devices having interconnected memory or non-connected memory. Such memory may be used to store programs, encrypted or unencrypted data, identifiers, and other information. The portable data transport device 22 also includes an embedded product identifier 34 unique to this portable data transport device 22 and unalterable. The first processor 30 is in communication with this identifier and may read it as needed.

Also forming a part of the portable data transport device 22 is a biometric reader 36 used to read a physical parameter of a person. An example of a biometric reader may be a fingerprint sensor that reads a person's fingerprint and provides data representative thereof. Connected to the reader is a biometric processor 38. The biometric processor is used to control the reader, receive biometric data read by it, and is also connected to the non-volatile memory 32. In one embodiment this non-volatile memory 32 may be integrated with the memory used by the first processor and in another embodiment, is separate therefrom. In one embodiment, the biometric reader 36 includes an identifier code 40, unique to itself, that is accessible to the biometric processor 38. In the embodiment shown, that identifier is physically a part of the reader and cannot be separated therefrom or altered. This is true also for an identifier code 42 for the biometric processor 38 and an identifier code 44 for the first processor 30. The memory 32 in this embodiment also has a unique and unalterable identifier code 46.

Upon initial set up of the portable data transport device 22, the unique code 40 of the biometric reader 36 is written into the memory 32 by the biometric processor 38, along with a confirming data key. In one aspect in accordance with the invention, the biometric processor 38 checks the identifier 40 of the reader, the identifier 46 of the memory 32, and the identifier 44 of the first processor 30 against stored identifiers each time the portable data transport device 22 is started up and if consistent matches are not found, the biometric processor erases its volatile memory and shuts down rendering the portable data transport device unusable. This feature prevents the substitution of components in the portable data transport device in an effort to circumvent one or more of the data security features. Likewise, the first processor 30 checks the identifiers of the components on the portable data transport device 22 and will erase its volatile memory and shut down if a discrepancy is found, also rendering the portable data transport device unusable.

The biometric reader 36 may be used to sense a person's fingerprint. Biometric data resulting from the sensed fingerprint is provided to the biometric processor 38. That processor compares the fingerprint data from the reader with pre-existing fingerprint data stored in the memory 32. If a match is found, the biometric processor then sends the confirming biometric data key stored in memory to the first processor 30. The first processor then compares the received confirming data key a reference data key stored in memory 32 and if a match is found, the first processor then permits the portable data transport device to be mounted to the host computer 24. In another embodiment, separate memory devices are used to provide further protection.

In more detail for one embodiment, upon each successful enrollment of each fingerprint, a 256-bit random number (RANDtemplate) is created and stored within the memory 32 used by the biometric processor 38, along with the template. Simultaneously, the RANDtemplate is stored within the memory 32 used by the first processor 30. Upon a successful login reported by the fingerprint scanner 36, the 256-bit RANDtemplate number associated with the login is retrieved, and compared against the value stored by the first processor in memory. If the value matches, then the login is authenticated and the first processor allows access to the portable data transport device 22 by the host. On the other hand, if the value does not match, the login fails and the first controller does not allow access to the portable data transport device.

Figure 6:
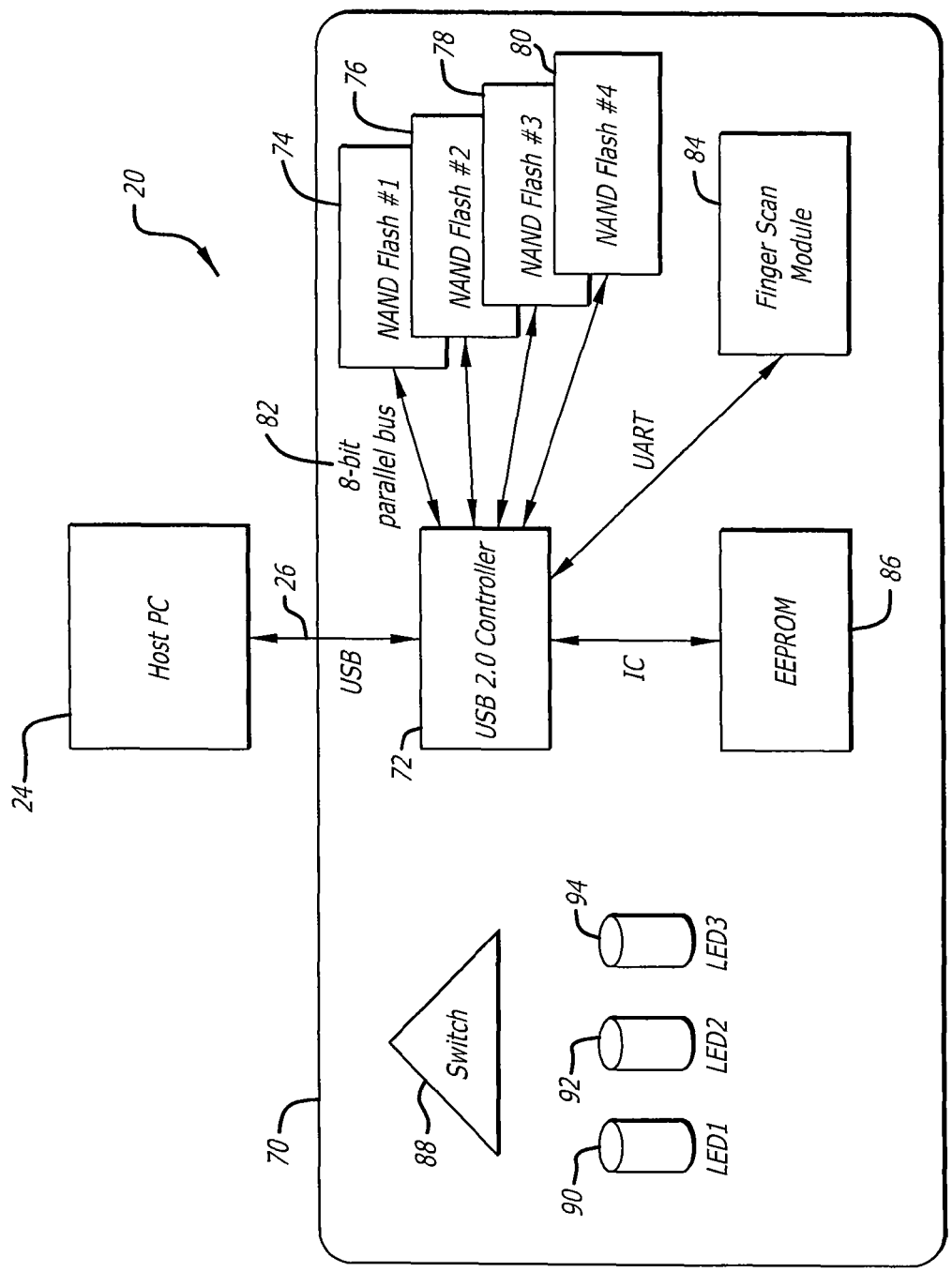
FIG. 6 is a block diagram of the internal components of the portable non-volatile data transport device shown in FIGS. 4 and 5.

In one embodiment, a biometric reader 36 also includes the biometric processor 38 and integral memory that is separate from the memory 32 used by the first processor 30. A portable data transport device 22 in this embodiment is capable of storing nine fingerprint templates—one template each from two fingers of two device administrators (total of four fingerprints), plus one template for each of five fingers of an enrolled user (total of five fingerprints) for a total of nine fingerprints or fingerprint templates. In accordance with this embodiment, two device "guardians" are assigned to each data transport device 22. The two guardians initiate the data transport device for use by means of each guardian entering the fingerprints from two different fingers into the biometric reader/processor/memory system 36, 38, 32 (FIG. 3) or finger scan module 84 (FIG. 6). The process of adding the fingerprint templates to the portable data transport device memory by the two guardians is also called "enrolling" as a guardian. Once two guardians have been enrolled with the portable data transport device, the guardians pass the device to a user for enrollment of that user. The user enrolls by scanning five different fingers into the biometric reader.

Having two guardians for each portable data transport device 22 makes it more likely that one will be available at a future date to enable the transfer of the data transport device to a new user. During enrollment of both guardians and user, the unique embedded identifier 34 of the portable data transport device is logged so that an organization can accurately account for each device. Guardians are given the authority to reset the portable data transport device for use by a new user, reset the portable data transport device for use with a new guardian or guardians, and clear the portable data transport device of everyone's fingerprints and all data. In one embodiment, the guardians must be different from each other and from the user. While guardians are able to control who uses the portable data transport device, guardians do not have access to any user contents (files) on the device 22 because the contents remain protected by the user's unique passwords. In one embodiment, the embedded identifier 34 of the portable data transport device is an eleven digit string.

Figure 4:
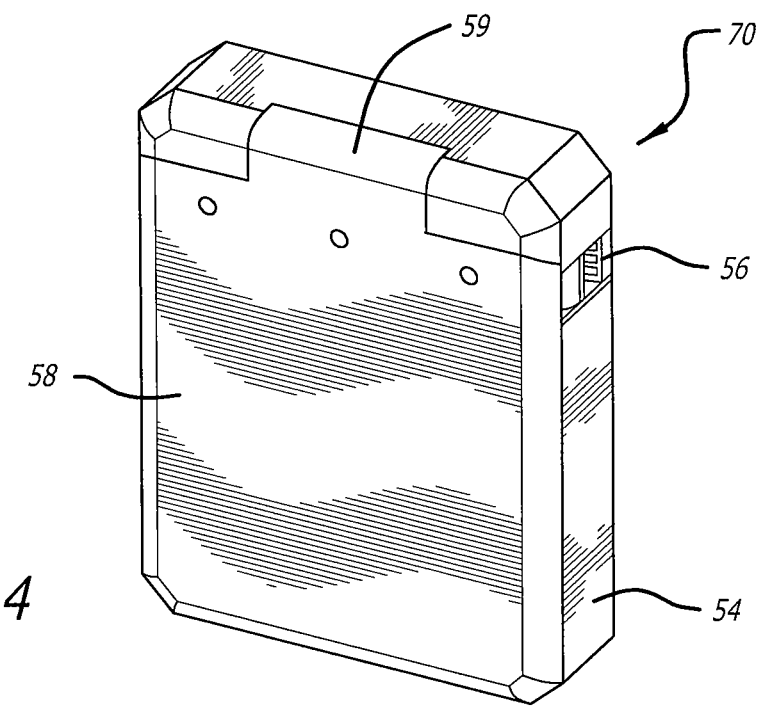
FIG. 4 is a perspective view of an embodiment of a portable non-volatile data transport device that may be used to provide the features of the invention, including a cover and a body member.
Figure 5:
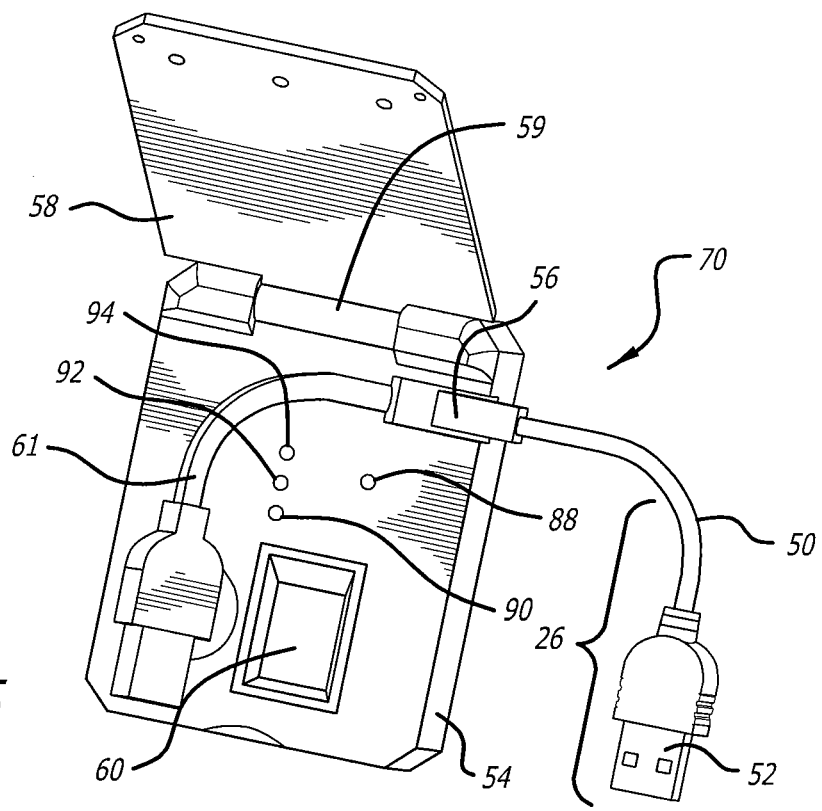
FIG. 5 is a perspective view of an embodiment of a portable non-volatile data transport device shown in FIG. 4 with the cover open, and having a USB cable and plug on a swivel connection, a plurality of indicator lights, a switch, and indentation in which the USB cable and plug rest when the cover is closed, and a fingerprint reader.

An example of a portable non-volatile data transport device 70 is shown in FIGS. 4 and 5. The device 70 includes a USB connection 26 comprising a standard USB cable 50 and plug connector 52. The USB cable is connected to the body 54 of the device with a swivel connection 56. In the embodiment of FIGS. 4 and 5, a cover 58 is hingedly 59 connected to the body so that it completely closes the biometric reader 34 as shown in FIG. 4. The USB plug 52 fits into a standard USB socket included with most computers currently manufactured, and would be used, in this case, to make electrical connection to the host computer to provide the necessary power for operation of the portable data transport device. Also shown is a fingerprint sensor device 60 comprising clear glass. An indentation 61 in the base is used to store the swivel cable and connector when not in use so that the cover may be closed over them for protection.

As a security feature and returning now to FIG. 3, the first processor 30 does not permit mounting of the data transport device 22 to the host computer 24 until a successful biometric login has been completed. This prevents software on the host computer from even "seeing" the portable data transport device 22 unless a login has been successful. The firmware 62 of the data transport device may be configured to prevent firmware upgrades so as, for example, to prevent undesired firmware to be loaded onto the device in an attempt to defeat this security feature.

A further security system will now be discussed. In accordance with another aspect of the invention, in this embodiment the firmware 62 has its own associated memory 64. In accordance with this aspect, during start up of the portable data transport device 22, the first processor 30 reads the embedded product identifier 34 of the portable data transport device, reads its own identifier 44, and reads the identifier of an encryption/decryption program residing in a dynamic link library 66. The first processor then performs a hash function of this data creating a hash value and forwards the created hash value to the firmware 62. The firmware memory 64 contains a previously stored current hash value and compares the hash value created by the first processor against this previously stored current hash value. If a match exists, the firmware and first processor disable the write protection of the portable data transport device and will permit read and write operations to the portable data transport device 32 from a host computer 24. If a mismatch exists, the firmware and first processor clear any volatile memory they had been using and prevent any further operations with the portable data transport device and become inactive thereby disabling the data transport device 22.

In one embodiment, the hash function comprises the use of the 256 bit Advanced Encryption Standard leading to a very secure hash value. In another embodiment, a hash function using "salt;" i.e., randomizing the hashing function, was used for greater security.

It will thus be appreciated that two separate security functions have been thus far described that assure the integrity of the portable data transport device 22, and both security functions must by passed to obtain operation of the portable data transport device. Both include checks of the existence of the original hardware based on their embedded identifiers. Changing the first processor 30, the firmware 62, or the memory 32 in which fingerprint data are kept will not achieve overcoming the security, since all identifiers are checked at start up and all have encrypted identifier stored from the last set up of the device 22. Attempting to swap the encryption program in the DLL 66 will not overcome the security system since the identifier of this program is included in a hash function. Changing its identifier will result in a hash value that does not match that reference current hash value in the firmware memory 64.

As a brief review of the operation of the portable data security data transport device 22 thus far, a biometric parameter of a user must be sensed, compared, and found to be an enrolled user. Next, the identifiers of all components on the portable data transport device are checked to be sure that no component has been replaced. Software and firmware identifications are also checked. Failure of any of these checks results in the portable data transport device clearing its operational memory and disabling itself from further functioning. In the event that these checks are all passed, the portable data transport device is then prepared for read and write functions with the host computer 24.

It is noted that the fingerprint authentication is only one layer of security. Also, identification checking presents a second layer of security. However, the requirements of both layers must be met before the portable data transport device 22 becomes available for read and write operations to a host computer 24. A further security feature will now be discussed. In this feature, encryption of data is conducted. Through this further feature, the secure data transport and storage system in accordance with the invention presents yet a further layer of security.

Referring now to FIG. 6, a block diagram of the portable data security data transport device 70 of FIGS. 4 and 5, comprising a flash device, is shown. In this embodiment, the portable data transport device includes a USB 2.0 controller 72, four NAND flash memory units 74, 76, 78, and 80 on an 8-bit parallel bus 82, a finger scan module 84, and an electrically erasable programmable read-only memory (EEPROM) 86 on a serial inter-integrated circuit ($I^2C$) bus. The finger scan module 82 may include the biometric processor, associated memory, and biometric reader as shown in FIG. 3, and in this case is on a universal asynchronous receiver/transmitter (UART) interface. The unit is connected to a host personal computer (PC) 24 typically through a USB port 26. The host PC 24 uses a standard mass storage class driver to access the NAND flash memory. No additional drivers need to be loaded on the host PC. Included with the portable data transport device 70 are an on-off switch 88 and three indicator lights 90, 92, and 94, in this case, light emitting diodes, to communicate status of the biometric identification process to a user. It should be noted that the arrangement of FIG. 6 is only one embodiment and is not meant to limit the invention. Other arrangements are possible.

Figure 7:
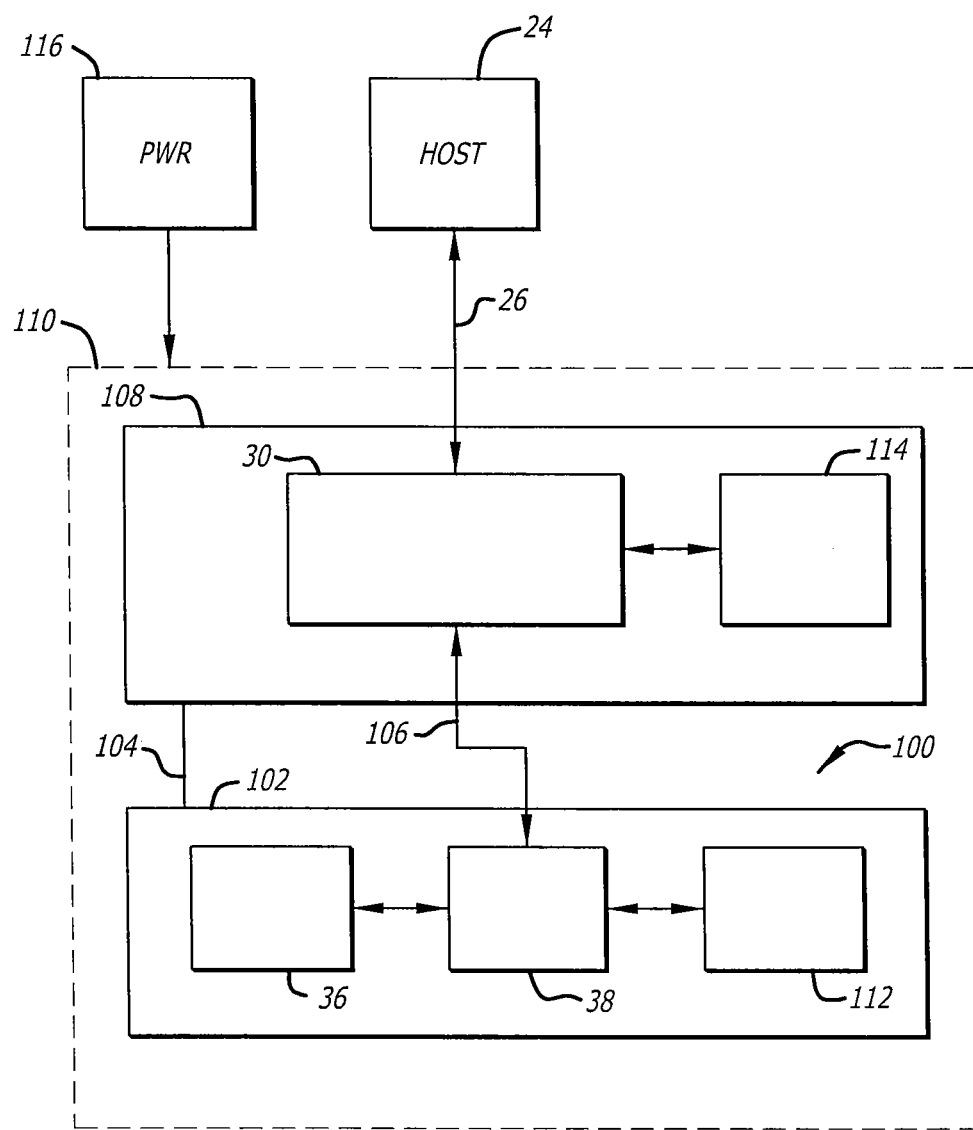
FIG. 7 is a block diagram similar to FIG. 3 showing a single host connected with a portable non-volatile data transport device having a first processor and non-volatile memory portion in communication with the host, and with a biometric processor and separate non-volatile memory portion permanently tethered and electrically connected with the first processor portion.

Turning now to FIG. 7, there is shown an alternate embodiment in which a biometric reader system 100 is located on a biometric body member 102 that is permanently tethered mechanically 104 and electrically 106 to a main body member 108 of the portable data security data transport device 110. The biometric body member includes the biometric reader 36, biometric processor 38, and associated memory 112. Although not shown, all components also include associated identifiers. In the main body member there is located the first processor 30 and associated devices such as memory 114. Power to run the portable data security data transport device 110 is provided separately 116, such as through batteries (not shown), or through a USB connection 26 with the host computer 24. In other embodiments, a backup battery or batteries (not shown) may be included with the portable data security data transport device.

Figure 8:
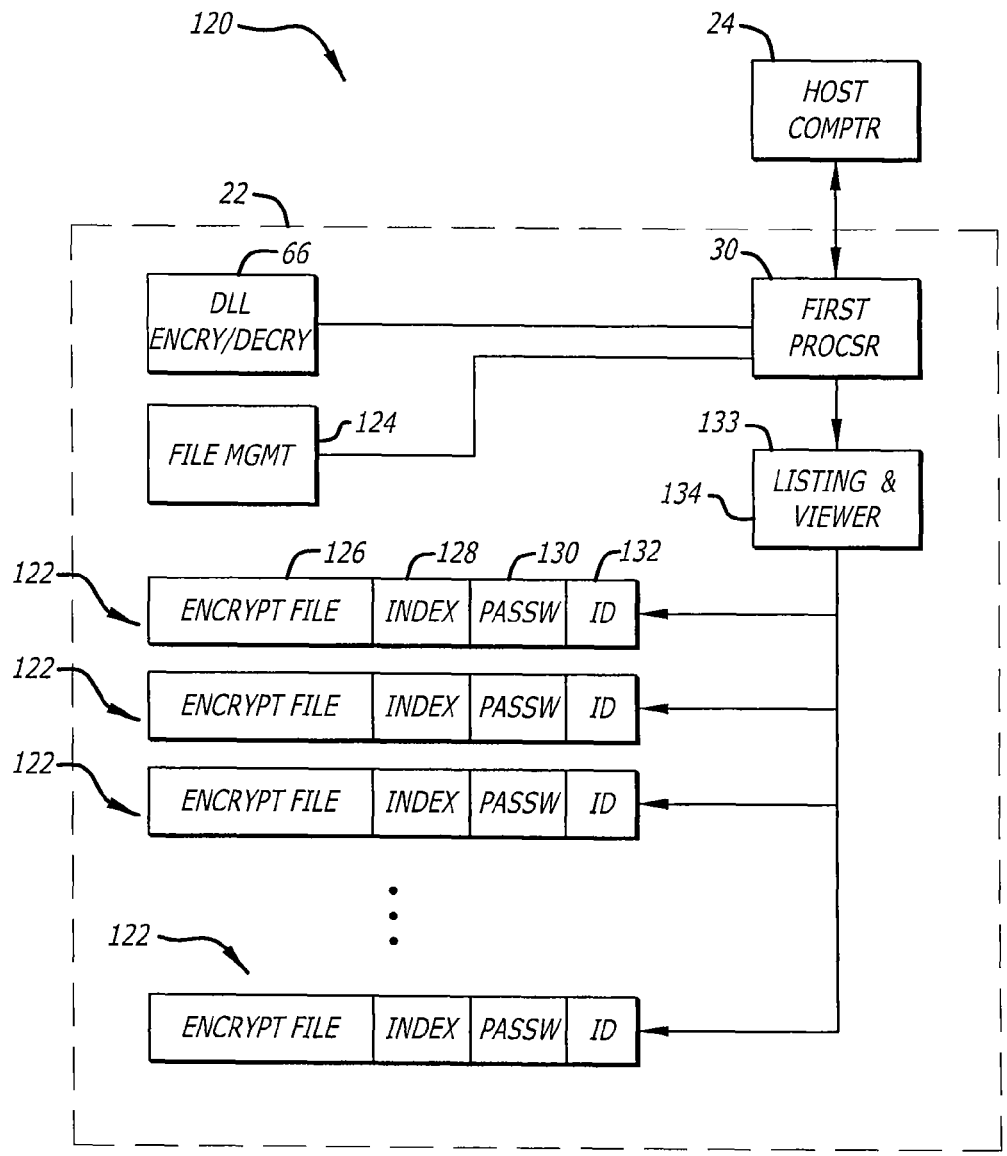
FIG. 8 is a block diagram of a file management program in accordance with aspects of the invention with which multiple files may be encrypted together to form a data container pack file a listing of the files within the pack file, a viewer of the individual files in the pack file, a password (PASSW), and a filename (ID)

File encryption/decryption in accordance with another aspect of the invention will now be discussed and shown. Referring to FIG. 8, there is shown a file management system 120 in which multiple files may be encrypted together into a single data container pack file. To the extent of available memory on the portable data security data transport device 22, multiple data container pack files 122 may be stored therein. Four such data container pack files are shown in FIG. 8 although many more may be stored therein, as indicated by the ellipses. An enrolled user at the host computer 24 through use of the file management software 124 may assemble multiple files to be encrypted together 126 through use of the encryption software 66 in the dynamic link library 66. The encryption software creates a listing (may be referred to as an index or directory) 128 of the files encrypted together in each data container pack file 122. The user is asked to assign a password 130, and a filename or identification 132. Although each data container pack file 122 in FIG. 8 has each of these elements, drawing numerals are only shown for one of the data container pack files to preserve clarity in the drawing. In one embodiment, the password will not be accepted by the first processor 30 unless it comprises at least ten characters, and must have at least two of each of the following: upper case letter, lower case letter, number, and special character in order to result in a strong password.

When an enrolled user desires to use one of the data container pack files 122, a listing window program 133 on the portable data transport device 22 provides a listing. Filenames 132 of pack files are displayed and the enrolled user may select one to review. The encryption/decryption software 66 will challenge with a password request and the enrolled user must respond by successfully entering the correct password 130 before the first processor 30 will grant access to the pack file 126. If the user enters an incorrect password a predetermined number of times, such as three times, the first processor is configured to clear its operating memory and cease operations with the host computer 24, since it is assumed that a user who is not enrolled is attempting to access the secure data. If the correct password is entered, a viewer program presents a viewer 134 that displays a listing of the files and folders in the selected data container pack file 122 to the enrolled user. The enrolled user may then select one or more of the indexed files and the decryption software 66 will decrypt those files for use by the enrolled user.

In yet another feature, upon successful mounting of the portable data security data transport device 22 to the host computer 24, the first processor 30 accesses memory 74, 76, 78, and 80 (see FIG. 6) for any unencrypted data before write protection of the portable data transport device 22 is removed. If any such unencrypted data is found, the first processor requires the enrolled user to either delete the data or encrypt the data before any further write operations may be performed. In another embodiment, the first processor is configured to automatically search the memory for unencrypted data and automatically delete it before write protection is removed. This feature provides further protection against the operation of possible security defeating programs that may have been surreptitiously installed on the portable data transport device.

Figure 9:
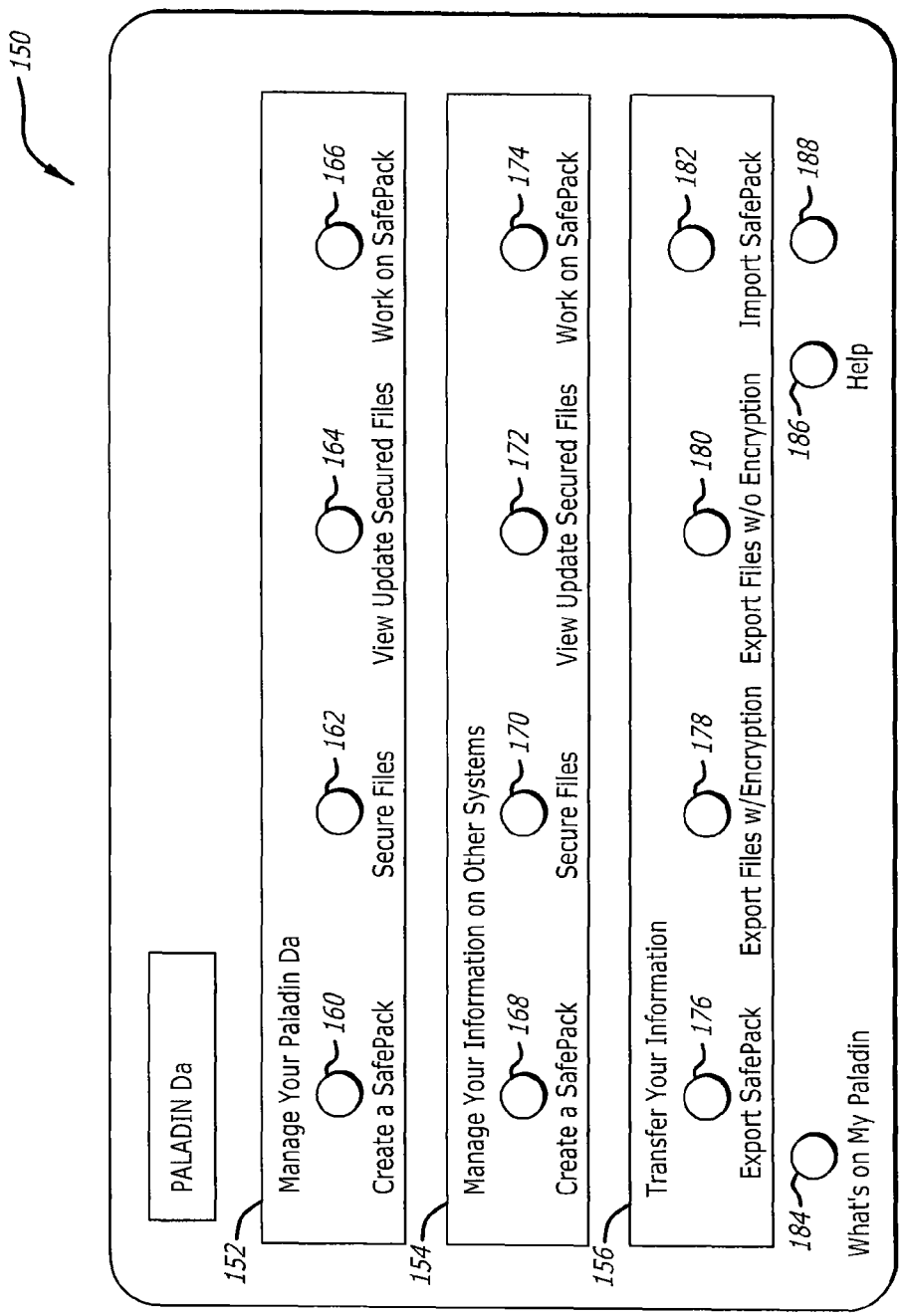
FIG. 9 is a screen display of an interface provided by the portable data transport device enabling an enrolled user to manage the secure data on the device.
Figure 10:
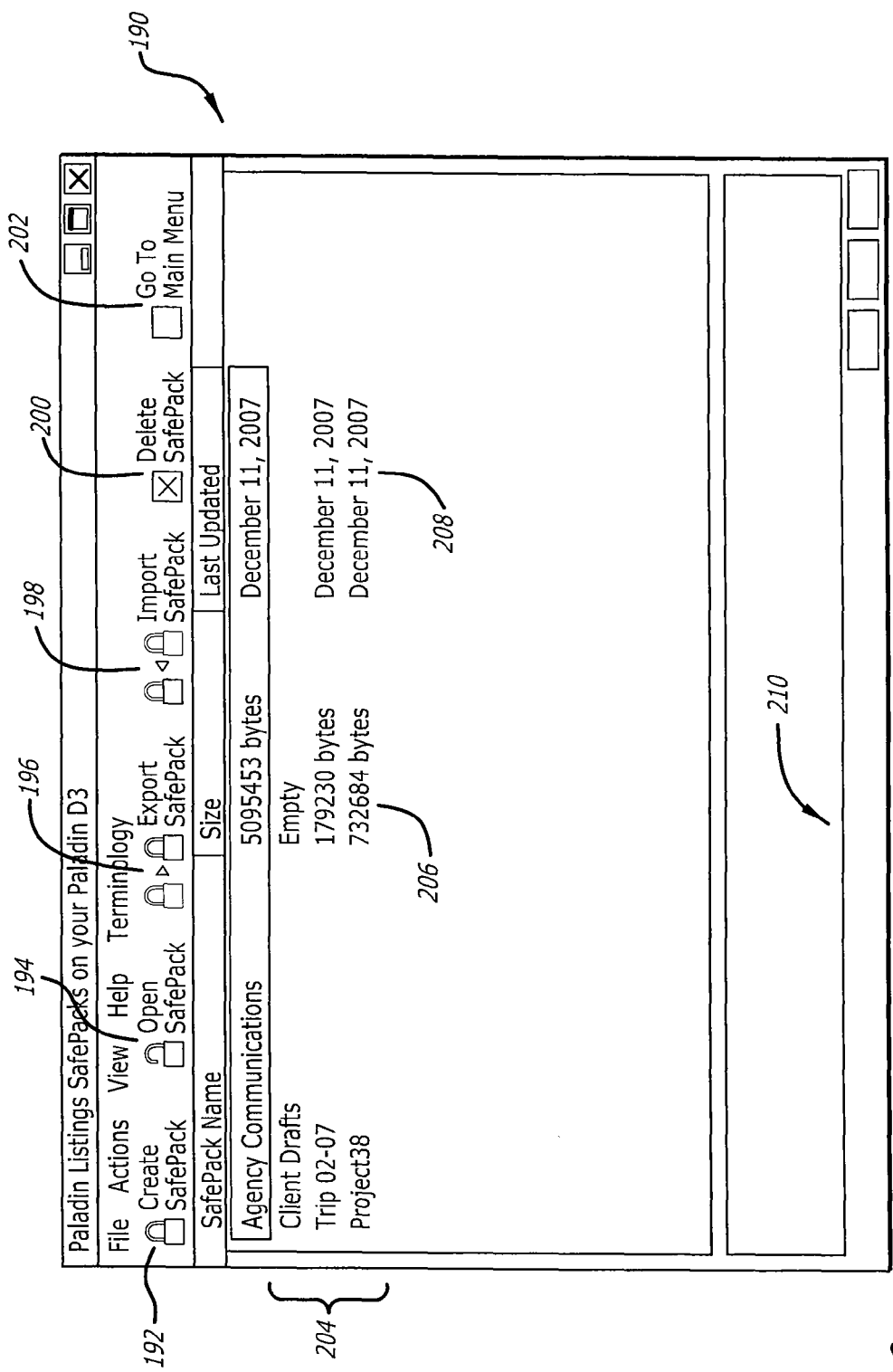
FIG. 10 is a screen display of an interface provided by the portable data transport device enabling an enrolled user to see a list of all the data container pack files on the device.
Figure 11:
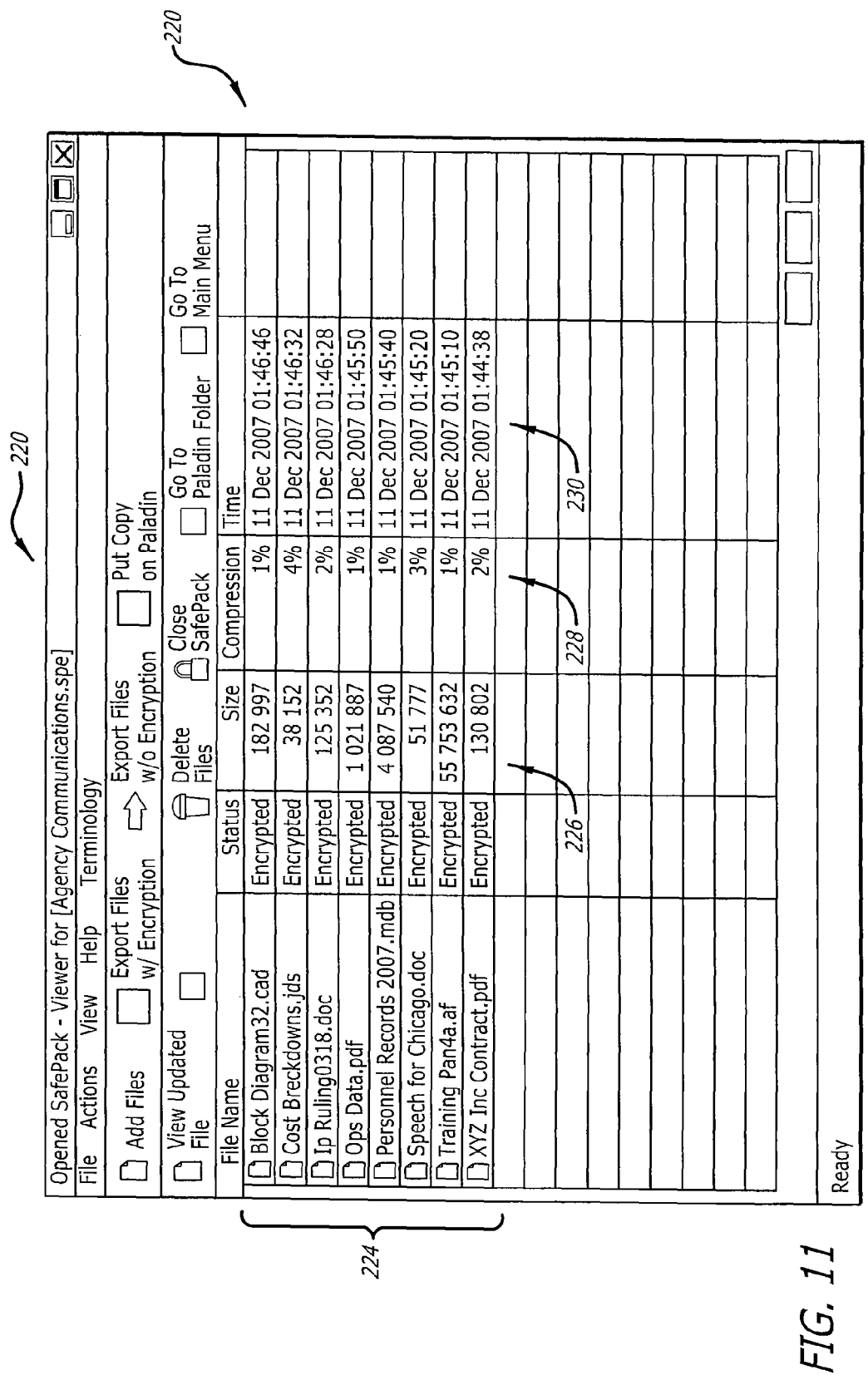
FIG. 11 is a screen display of a viewer interface provided by the portable data transport device enabling an enrolled user who has entered the correct password for a particular data container pack file to view the list of files encrypted into the selected data container pack file and to manage them.

Turning now to FIGS. 9, 10, and 11, user interfaces for one embodiment are shown. In FIG. 9, successfully logging into the biometric system 84 (FIG. 6) will result in the main menu 150 appearing on the screen of the host computer. The main menu includes three tiers 152, 154, 156 in this embodiment:

1. "Manage Your ... [data transport device]" 152—used for encrypting information and working with secure data on the data transport device 70 (FIGS. 4, 5, and 6). This tier includes the four buttons of Create A SafePack 160, Secure Files 162, View/Update Secured Files 164, and Work on SafePack 166;

2. "Manage Your Information On Other Systems" 154—used for encrypting information and work with secure data on other systems and devices. These include a host network and host computing system, as well as a laptop, removable drive, or some other user's secure data transport device 70 plugged into the host computer. The four buttons are Create a SafePack 168, Secure Files 170, View/Update Secured Files 172, and Work on SafePack 174; and 3. "Transfer Your Information" 156—used to transfer your sensitive information between any of the locations specified; i.e., "Expert SafePack" 176, "Export Files w/Encryption" 178, "Export Files w/o Encryption" 180, and "Import SafePack"182.

The term "SafePack" used in the drawings is a term for what has been described herein as a "data container pack file."

Three more buttons at the bottom of the interface permit further functions:

1. "What's On My ... [data transport device]" 184—brings up the listing window discussed below in conjunction with FIG. 10;

2. "Help" 186—brings up an extensive help system; and

3. "Under the Hood" 188—brings up a look at the inner workings of the product.

It will be noted that the "Transfer Your Information" interface and programs supporting it enable a user to store encrypted and password protected files on other devices, which can include laptops, host computer, networks, and other equipment. Thus users at other locations can have access to the data container pack file and files therein. They may also be exported without encryption.

After selecting the "What's On My Paladin" button, a directory or "listing window" 190, an example of which is shown in FIG. 10, will be displayed. This Listing Window provides all the tools needed to work with a data container pack file located on the data transport device. From this window, the user can create 192, open 194, or delete 200 a data container pack file or copy or move 196 an entire data container pack file to or from another system, or import 198 a safepack or go to 202 Main Menu. These features are accessed via the Toolbar buttons or the drop-down Actions on the Menu bar near the top of the screen.

The Listing Window 190 shows every data container pack file 204 currently on the data transport device 70, with its size 206 and the last update time 208. There is also an indication of the size of the pack file and an indication of how much space 210 is still available on the portable data transport device.

To work with the individual contents of a data container pack file contained on the portable data transport device, that data container pack file is opened. When opened, the Viewer screen 220, an embodiment of which is shown in FIG. 11, automatically opens on the host computer. The Viewer provides tools needed to work with the contents of the selected data container pack file. Each data container pack file has its own viewer. The Title Bar at the top indicates which data container pack file is being viewed. However, the user can only see inside the Viewer when the data container pack file has been opened using its unique password. The Viewer in this embodiment lists every file 224 in the selected data container pack file along with its size 226, rate of compression 228, and last update time 230. A file inside a data container pack file is always encrypted unless you explicitly select it to view or update. Any folder in the selected data container pack file are also listed. To see or work with the content of a folder, double click on the folder name. From the Viewer, the user can modify the selected data container pack file's contents (for example, "Add" or "Delete"), move files to other locations ("Export," "Copy") and also take files out of the selected data container pack file to work on them temporarily ("View/Update" and "Done with View/Update"). The View/Update function includes dialog boxes and prompts for a guided flow to make its capabilities available to the user.

The software may be updated as follows. Once authenticated, the software may perform the following operations. The software calculates the original software hash as described above. The software calculates the updated software hash value with reference to an updated cryptographic DLL 66, the updated software executable, and the unique identification string 34 from the device 22. The software delivers the original software hash value and the updated software hash value to the device using a Modify Hash Command. The software may then write the updated software to the storage.

In one embodiment of FIG. 6, the controller 72 was a CY7C68014A USB Microcontroller from Cypress Semiconductor Corporation of San Jose, Calif. The fingerprint scanner module 84 was a UPEK TFM-UCEBBIC that was pre-programmed and calibrated by UPEK, Inc. of Emeryville, Calif. The NAND flash memory 74, 76, 78, and 80 comprised two configurations, one sixteen GB Micron MT29F16G08FAA (two gigabytes) and two sixteen GB Micron MT29F16G08FAA (four gigabytes), from Micron Technology, Inc. of Boise, Id.

In one embodiment, the portable data transport device used encryption at 256 bit AES (advanced encryption standard) and met rigorous Federal Information Processing Standards (FIPS) for the security requirements of cryptographic modules (FIPS 140-2) and for personal identity verification programs (FIPS 201).

The invention thus provides multiple layers of data security for a data transport device. The data security features have been integrated into the device as part of the basic architecture and form part of the very foundation of hardware, firmware, and software. They are an integral part of the very structure of the portable data transport device and not merely as add-on features. Defeating such inherent and foundational security features, if possible at all, would require extreme efforts at extreme expense and amounts of time so great as to make such efforts highly undesirable and unlikely to be undertaken. Traveling with data transported by the portable data transport device in accordance with the invention provides a much higher level of security. While the enrolled user is able to view, modify, control, share, and present the secured files on the transport device as desired, other persons cannot. Freedom of movement results and if the transport device is lost or stolen, the data on the device is protected. The architecture of the data transport device in which security features are fully integrated with data management processes as a matter of foundational design in accordance with the invention, facilitate data and file management on and off the data transport device.

The following further documents are enclosed herewith and are incorporated herein by reference: 1. "Paladin D3 Data Defending Device, Premier Defense For Information In Transport, Series B" (User's Manual); 2. "What Is A Guardian" (Guardian Manual); 3. "When Key Information Is Exposed, It Compromises Your Mission;" 4. "Paladin D3™ Series B Capabilities;" 5. "Paladin D3 Data Defending Device, New Series B Capabilities;" 6. "The Paladin D3-Series B: Summary of Full Feature Set;" 7. "Paladin D3 Data Defending Device-Overview."

The invention may be embodied in forms other than those described above and shown in the accompanying drawings without departure from the scope and essential characteristics thereof. The embodiments described therefore are to be considered in all respects as illustrative and not restrictive. Accordingly, the scope of the invention is intended to be defined only by reference to the appended claims.

What is claimed is:

1. A portable data transport device that provides security to data stored therein, and is configured to communicate data with a host computer, the portable data transport device comprising:
   a first processor configured for communication with the host computer to which the portable data transport device is connected, the first processor configured to block mounting of the portable data transport device to the host computer until the first processor receives a data key match;
   a non-volatile memory in which is stored a confirming data key and data representing a physical parameter of an enrolled user of the portable data transport device;
   a biometric processor in communication with the non-volatile memory; and
   a biometric reader disposed as part of the portable data transport device and disposed in communication with the biometric processor, the biometric reader configured to read a predetermined physical parameter of a person and provide data representing the physical parameter that was read;
   wherein the biometric processor is configured to receive the data representing the read physical parameter, compare it to stored data representing a physical characteristic of the enrolled user stored in the non-volatile memory, and if a match results, output the confirming data key from the non-volatile memory;
   wherein the first processor is configured to receive the output confirming data key from the biometric processor, compare the received confirming data key with a stored reference data key, and if a match is found, cease blocking the mounting of the portable data transport device to the connected host computer;
   wherein the biometric reader comprises a unique biometric reader identifier code;
   the non-volatile memory stores a reference biometric reader identifier code for the biometric reader;
   the biometric processor is configured to process physical parameter data from the reader only after it has:
      read the unique identifier code from the biometric reader,
      compared it to the reference biometric reader identifier code stored in the non-volatile memory, and
      found a match between the two identifier codes;
   wherein the portable data transport device comprises:
      an embedded product identifier; and
      executable operational software having an associated identifier;
      the software is configured to apply a hash function comprising the embedded product identifier and the software identifier to create a hash value;
      the portable data transport device compares the created hash value against a current hash value stored in the portable data transport device and if a match is found, the portable data transport device permits both read and write operations to occur;

wherein the portable data transport device further comprises:
firmware and associated firmware memory that is accessible only to the firmware, wherein the current hash value is stored in the firmware memory; and
an encryption/decryption program having an associated identifier;
the software is configured to run the hash function further comprising the encryption/decryption program identifier;
the firmware compares the created hash value against the current hash value stored in the firmware memory and if a match is found, the firmware removes write protection from the portable data transport device; and
neither the comparison between data keys nor the comparison between hash function values can be overridden or otherwise avoided, and the received confirming data key must match with the stored reference data key and the created hash function value must match with a stored current hash function value before read and write operations on the portable data transport device are permitted.

2. The portable data transport device of claim 1 wherein the first processor is configured, upon mounting the portable data transport device to the host computer, to initially review data on the non-volatile memory for unencrypted data and if such is found, to prohibit read/write operations until either the unencrypted data is deleted or encrypted and to indicate to the enrolled user that such data must be encrypted or deleted before further operations with the portable data transport device will be permitted.

3. The portable data transport device of claim 1 wherein the first processor is configured to review data on the non-volatile memory for unencrypted data after mounting the portable data transport device to the host computer, and to auto-detect and delete any unencrypted data found on the portable data transport device.

4. The portable data transport device of claim 3 further comprising a file security program that comprises:
an encryption operation that allows the enrolled user at the host computer to select multiple files to be encrypted together into a single data container pack file and to store that data container pack file on the portable data transport device; and
a decryption operation that allows the enrolled user at the host computer to select and decrypt files included in the single data container pack file stored on the portable data transport device;
a listing window program that lists all data container pack files present on the portable data transport device so that each may be selected;
a viewer program with which an enrolled user may view the contents of the selected data container pack file;
wherein data container pack files are configured such that when initially selected to be opened by the decryption operation at the portable data transport device, only an index of the files encrypted together into the selected data container pack file is displayed, and from that index one or more files may be selected for decryption;
wherein the portable data transport device includes a file viewer program with which an enrolled user using a host computer may view the index of data container pack files stored in the portable data transport device.

5. The portable data transport device of claim 4 wherein the biometric function, identifier matching functions, and the file security program are self-contained whereby the portable data transport device is agnostic in regard to host computers.

6. The portable data transport device of claim 4 wherein:
the file security program is configured to permit the enrolled user at the host computer to selectively assign a different password to each data container pack file on the data transport device whereby individual files within the data container pack file do not have individual passwords and are subject to decryption only upon successful entry of the password for the associated data container pack file;
the file security program is configured so that data container pack files stored on the portable data transport device cannot be opened without input of the different password for the data container pack file; and
if a user enters an incorrect password a predetermined number of times, the first processor will lock itself in a non-operational configuration.

7. The portable data transport device of claim 1 wherein the portable data transport device includes a file security program comprising a dynamic link library containing an encryption/decryption operation program;
wherein the portable data transport device is configured to perform a self-check of the encryption/decryption program of the dynamic link library prior to permitting read/write operations of the portable data transport device, wherein the self check process comprises determining if any changes have occurred in the encryption/decryption program of the dynamic link library since the last check of the dynamic link library and if any changes are found, the portable data transport device is further configured to prohibit read and write operations of the portable data transport device.

8. The portable data transport device of claim 1 wherein the first processor comprises a file security program comprising an encryption operation that allows the enrolled user to select multiple files to be encrypted together into a single data container pack file and to store that data container pack file on the portable data transport device.

9. The portable data transport device of claim 8 wherein the file security program further comprises:
a decryption operation that allows the enrolled user at a host computer to select and decrypt files included in a data container pack file; and
a listing window program that lists all data container pack files present on the portable data transport device so that each may be selected.

10. The portable data transport device of claim 9 wherein the file security program further comprises a viewer program with which the enrolled user may view the contents of a selected data container pack file.

11. The portable data transport device of claim 1 further comprising:
a file security program comprising an encryption operation that allows the enrolled user to select multiple files to be encrypted together into a single data container pack file and to store that data container pack file on the portable data transport device, on the host computer, or on another device as selected.

12. The portable data transport device of claim 1 wherein:
the biometric processor is programmed to receive identifying physical parameter data from a person designated as a guardian, to enroll the guardian by storing such identifying data in memory, and to identify the guardian by data comparisons from future biometric scans;
wherein the first processor requires that the guardian be successfully identified from such a scan before a person can be enrolled as a user of the portable data transport device; and the first processor restricts the guardian to administrative actions and does not permit the guardian to review any data stored on the portable data transport device.

13. The portable data transport device of claim 12 wherein the first processor is configured to require the enrollment of two guardians before a user can be enrolled.

* * * * *